United States Patent [19]

Zaba

[11] 4,380,897
[45] Apr. 26, 1983

[54] GAS TURBINE CONTAINING AN ADDITIONAL COMBUSTION GAS COMPRESSOR

[75] Inventor: Tadeusz Zaba, Ennetbaden, Switzerland

[73] Assignee: BBC Brown, Boveri & Company Limited, Baden, Switzerland

[21] Appl. No.: 191,383

[22] Filed: Sep. 29, 1980

[30] Foreign Application Priority Data

Nov. 14, 1979 [CH] Switzerland ............... 10148/79

[51] Int. Cl.³ ........................... F02C 3/22; F02C 7/36
[52] U.S. Cl. ................................. 60/39.33; 60/39.465
[58] Field of Search ............ 60/39.12, 39.33, 39.46 G; 415/122 R; 74/424.5

[56] References Cited

U.S. PATENT DOCUMENTS 1,903,210  3/1933  Carrier ........................... 415/122
1,973,554  9/1934  Bentley ........................... 74/424.5
2,845,776  8/1958  Traupel ........................ 60/39.46 G Primary Examiner—Louis J. Casaregola
Attorney, Agent, or Firm—Werner W. Kleeman

[57] ABSTRACT

A gas turbine containing an additional combustion gas compressor and a gearing drive which, on the one hand, is rotatably connected by means of a rigid coupling and an axial bearing with the gas turbine and, on the other hand, is rotatably connected by means of a further rigid coupling with the combustion gas compressor. Furthermore, the gearing drive serves to drive a generator by means of a power take-off shaft. The gears of the gearing drive possess helical teeth. For thrust compensation purposes the drive gear of the gearing drive is provided with pressure plates, and the helical teeth of the gears are designed such that a force acting upon the pressure plates and resulting from the thrust of the combustion gas compressor is reduced by the axial component of the helical teeth.

2 Claims, 2 Drawing Figures

GAS TURBINE CONTAINING AN ADDITIONAL COMBUSTION GAS COMPRESSOR

BACKGROUND OF THE INVENTION

The present invention relates to a new and improved construction of a gas turbine containing an additional combustion or combustible gas compressor and a gearing drive. The gearing drive is connected, on the one hand, by means of a rigid coupling or clutch and an axial bearing with the gas turbine and, on the other hand, by means of a further rigid coupling with the combustion gas compressor. Additionally, the gearing drive drives a generator by means of a power take-off shaft, and the gears of the gearing drive possess helical teeth.

Such type of installations are known to the art. Between the gearing drive and the combustion gas compressor there is arranged a special coupling or clutch, for instance a dispaceable claw coupling, so that the residual-axial thrust of the combustion gas compressor can be compensated. Moreover, the combustion gas compressor possesses its own thrust bearing for taking-up thrust forces. The internal axial thrust is extensively compensated by a thrust compensation piston (see "Stahl u. Eisen", 80 (1960), Volume 22, Page 1544, FIG. 6).

Since during the operation of a gas turbine with a combustible or fuel gas, which has a lower calorific value than natural gas, it is necessary to use a quantity of fuel gas which amounts to 10 to 20 times that of the natural gas in order to achieve the same output, it is necessary when using a standard gas turbine without altering the turbine blading to correspondingly reduce the discharge of the air compressor. With this technique the axial thrust of the turbine is increased so that the loading of the axial bearing is impermissibly increased.

SUMMARY OF THE INVENTION

Therefore, with the foregoing in mind it is a primary object of the present invention to provide thrust compensation at a standard gas turbine wherein, without the need for resorting to additional structural measures, the additional axial thrust which is generated by the combustible gas compressor can be compensated without such even acting upon the turbine shaft and the axial bearing.

Now in order to implement this object and others which will become more readily apparent as the description proceeds, the invention contemplates providing as the thrust compensation for the drive gear of the gearing drive pressure plates, and that the helical teeth of the gears are designed such that a force acting upon the pressure plates and resulting from the thrust of the combustible gas compressor is reduced by the axial component of the helical teeth.

Due to the use of a drive gear which is equipped with pressure plates the axial thrust resulting from the gas compressor can be beneficially employed for load relieving the axial bearing of the gas turbine. Due to the selection of the helix angle of the helical teeth together with the use of the pressure plates the thrust force of the combustible gas compressor is transmitted by means of the gearing drive to the rigid coupling between the gearing drive and the gas turbine, without additionally loading the pressure plates.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
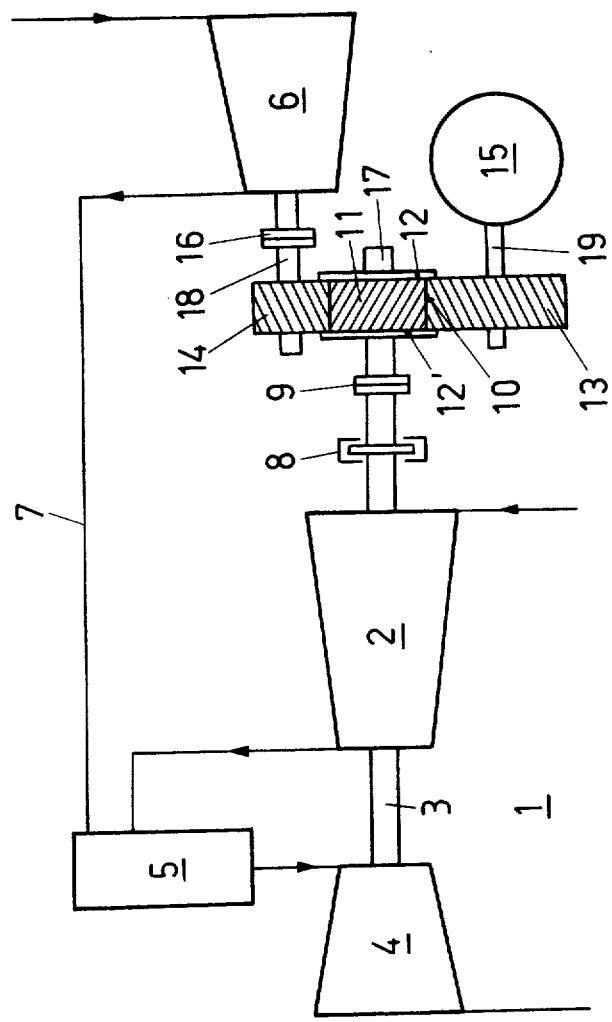
FIG. 1 schematically illustrates the gas turbine installation containing an additional combustible gas compressor.

Describing now the drawings, in FIG. 1 reference character 1 designates a gas turbine installation equipped with a compressor 2 and a turbine 4 arranged upon a common shaft 3, there also being provided a combustion chamber 5. The gas turbine installation 1 is operated with a fuel or combustible gas having a low calorific value, for instance with blast furnace gas. To this end there is provided an additional combustible gas compressor 6 from which the compressed combustible or fuel gas is delivered by means of a line 7 to the combustion chamber 5 and at that location admixed with combustion air which has been compressed in the compressor 2 and then such mixture is ignited. The shaft 3 of the gas turbine or gas turbine installation 1 is mounted at the side of the compressor 2 in an axial bearing 8 and operatively coupled by means of a rigid coupling 9 or equivalent structure with a gearing shaft 17 of a gearing drive 10. A drive gear 11 of the gearing drive 10 is provided with pressure plates 12 or equivalent structure. By means of the power take-off gears 13 and 14 of the gearing drive 10, there is first of all driven by means of a first power take-off shaft 19 a generator 15 and, additionally, there is driven by means of a second power take-off shaft 18 and a second rigid clutch 16 the combustible gas compressor 6.

Figure 2:
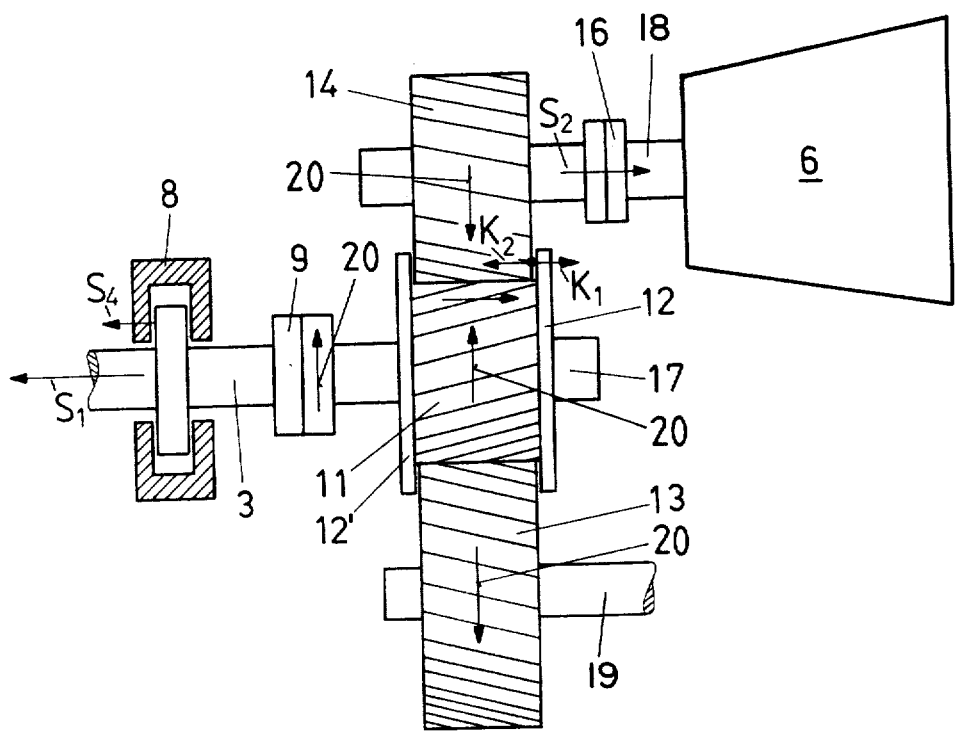
FIG. 2 illustrates the gearing drive of FIG. 1 showing therein the distribution of the forces.

Now in the arrangement of FIG. 2 there have been shown the distribution of the forces, wherein reference character $S_1$ designates the axial thrust of the shaft 3 of the gas turbine installation 1, reference character $S_2$ designates the axial thrust of the combustible gas compressor 6, reference character $S_4$ designates the thrust acting upon the axial bearing 8, wherein $S_4 = S_1 - S_2$. If there were selected for the drive gears 11, 13, 14 spur teeth having a tooth angle O, then the force $K_1$ acting upon the pressure plate 12 is of the same magnitude as the thrust force $S_2$. The arrows 20 designate the direction of rotation of the drive gear 11, the power take-off gears 13 and 14 as well as the shaft 3 provided with the rigid coupling 9.

By designing the gears of the gearing drive with helical teeth there is formed an axial component $K_2$ during the force transmission. Advantageously, the tooth or helix angle of the gears 11, 13 and 14 is chosen such that this axial component $K_2$ opposes the force $K_1$. The force $K_1$ acting upon the pressure plates 12 and 12' therefore amounts to:

$$K_1 = S_2 - K_2,$$

and since $K_1 < S_2$ also the load and wear of the pressure plates 12 and 12' is less.

Due to the inventive construction of the drive gear 11 with the pressure plates 12 and 12' as well as the corresponding selection of the tooth angle for the helical teeth of the gears 11, 13 and 14 it is possible for the axial thrust of the combustible gas compressor 6 to be employed to relieve the load of the axial bearing 8 without any further special constructional measures being undertaken. The selection of the correct tooth angle additionally renders possible, in a most simple manner, the reduction of the forces acting upon the pressure plates 12 and 12' by virtue of the thrust transmission.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A gas turbine installation comprising:
   a gas turbine;
   a combustible gas compressor;
   a gearing drive containing gears;
   a coupling and an axial bearing for rotatably connecting the gearing drive with the gas turbine;
   a further coupling for rotatably connecting said gearing drive with the combustible gas compressor;
   a generator;
   a power take-off shaft for driving said generator by means of said gearing drive;
   said gears of said gearing drive containing helical teeth;
   said gears of said gearing drive including a drive gear;
   pressure plates provided for said drive gear of said gearing drive for thrust compensation; and
   the helical teeth of the gears of said gearing drive possessing helix angles selected such that a force acting upon the pressure plates and resulting from a thrust applied by the combustible gas compressor is reduced by axial components of the helical teeth.

2. The gas turbine installation as defined in claim 1, wherein:
   said pressure plates comprises a pair of spaced pressure plates between which there is arranged said gearing drive;
   said combustible gas compressor being provided with a shaft;
   one of said gears of said gearing drive being operatively associated with said shaft of said combustible gas compressor; and
   said one gear being freely displaceable within the tooth width of the drive gear determined by the spacing between both of said spaced pressure plates to enable said freely displaceable one gear to impact against inner surfaces of said spaced pressure plates.

* * * * *